United States Patent [19]
Andersson

[11] Patent Number: 5,853,494
[45] Date of Patent: Dec. 29, 1998

[54] METHOD FOR AUTOMATIC WASHING OF VEHICLES

[75] Inventor: Kenneth Andersson, Postlåda 2484D, S-446 92 Älvängen, Sweden

[73] Assignees: Kenneth Andersson, Alvangen; Lars Erik Samuelson, Onsala, both of Sweden

[21] Appl. No.: 764,648

[22] Filed: Dec. 11, 1996

Related U.S. Application Data

[63] Continuation of Ser. No. 313,173, Dec. 7, 1994, abandoned.

[30] Foreign Application Priority Data

Apr. 9, 1992 [SE] Sweden .................................. 9201153

[51] Int. Cl.⁶ ................................ B08B 3/04; B08B 7/04
[52] U.S. Cl. ............................ 134/10; 134/25.5; 134/26; 134/36; 134/123
[58] Field of Search ........................... 134/10, 25.5, 123, 134/26, 36

[56] References Cited

U.S. PATENT DOCUMENTS

| | | | |
|---|---|---|---|
| 3,378,018 | 4/1968 | Lawter | 134/123 X |
| 3,502,215 | 3/1970 | Cahan | 134/123 X |
| 3,774,625 | 11/1973 | Willtrout | 134/104 |
| 3,911,938 | 10/1975 | Wiltrout | 134/123 X |
| 4,029,114 | 6/1977 | Wiltrout | 134/123 X |
| 4,652,368 | 3/1987 | Ennis et al. | 134/123 X |
| 4,654,089 | 3/1987 | Singelyn et al. | 134/10 X |
| 4,716,916 | 1/1988 | Hodge | 134/123 |

FOREIGN PATENT DOCUMENTS 1407894  6/1973  United Kingdom .

*Primary Examiner*—Harold Y. Pyon
*Assistant Examiner*—Saeed Chaudhry
*Attorney, Agent, or Firm*—Dvorak & Orum

[57] ABSTRACT

A method of automatic washing of vehicles, wherein recirculation and reuse of a substantial proportion of the washing liquid takes place during the washing procedure proper and wherein a principle of counter-flow is used, whereby the vehicle will be washed in a dirtier washing liquid during early treatment states than in later ones. The vehicle is positioned in at least one treatment station, where a plurality of the treatment steps are then carried out, and in the first treatment step treatment liquid is supplied from a first treatment tank and is sprayed onto the vehicle together with additives, if any, and together with impurities originating from the vehicle the liquid thus supplied flows through openings in the floor and is returned to the first treatment tank. In this manner a substantial proportion of the treatment liquid is reused and in the following treatment step treatment liquid is supplied from a second treatment tank to be sprayed onto the vehicle together with additives, if any, and is then, after drainage, returned to the second treatment tank, and so on, to be used in the subsequent treatment step, so that in each treatment step a treatment tank specific for that particular treatment step is used and reuse of a substantial proportion of the treatment liquid takes place. Each treatment tank is also replenished with a supplementary amount of liquid.

17 Claims, 2 Drawing Sheets

METHOD FOR AUTOMATIC WASHING OF VEHICLES

This application is a continuation of application Ser. No. 08/313,173, filed 7 Dec. 1994, now abandoned which is a 371 of PCT/SE93/00322, filed 13 Apr. 1993.

TECHNICAL FIELD

The present invention concerns a method for automatic washing of vehicles, wherein recirculation and reuse of a substantial proportion of the washing liquid takes place during the washing procedure proper and wherein a principle of counter-flow is used, whereby the vehicle will be washed in a dirtier washing liquid during early treatment stages than in later ones.

BACKGROUND OF THE INVENTION

Washing of passenger cars, buses and trucks is carried out in essentially two ways, i.e.manually or in automatic washing installations. The impurities which are removed from the car during the washing are flushed down the drains together with the spent detergent. In manual car-washing, detergents of cold-degreasing type usually are used. Such degreasing agents assist in dissolving oil and grease that otherwise would have remained on the vehicle. Following the treatment with the cold-degreasing agent a schampoo comprising surfactants, completing agents and dispersing agents is used. In other words, considerable amounts of often environmentally harmful substances are emitted into the drains and end up in recipients or in the sewage disposal system. For example, engine oils often contain decomposition products that are very harmful to the environment, such as PCB (polychlorinated biphenyle) and the like.

The mode of operation of car-wash installations varies according to season. In the wintertime, a cold-degreasing agent or a pre-wash including cold-degreasing agents is almost always used. Thereafter, the car is washed with some kind of schampoo, and is rinsed. The installations are equipped with oil separators designed to separate the oil and impurities dissolved in the oil. Impurities in the liquid phase follow the drainage water into the recipients or the sewage disposal system. Strangely enough, these conditions have been accepted for quite some time, although in Sweden alone between 40,000 and 60,000 tons of degreasing products end up in the environment in some form in this way. Some attempts have been made to find environmentally more acceptable chemical products but as a rule such products are less efficient from a cleaning point of view. Washing with hot washing liquids could improve the cleaning power but would increase the energy costs to an unacceptable level, because in a conventional car-washing installation the hot washing liquid would be let out directly to the drains.

On the whole, the development within the technology of automatic car-washing installations has concentrated on increasingly advanced mechanical means in the washing devices, introduction of flushing of the bottom faces of the engine and the chassis from below, of washing of the lateral faces of the wheels clean of asbestos and dirt, and application of rinsing agents and wax to ensure that the final result will be the best possible. Increasingly efficient detergents are being developed but as a rule without considering the effects on the environment. Microemulsion products, for instance, are perfectly stable, infinitly dilutable and, having passed through oil filters and separators, these products have a higher content of oil rather than a lower one, and for the reasons stated their use is prohibited in many countries.

Owing to the particular road conditions in Sweden, exposing the cars being to salt and torn-off asphalt particles in the wintertime and to splashes of molten asphalt from road re-construction work in the summer, the chemicals and the washing process must fulfil very strict requirements. The molten asphalt must actually be dissolved by a solvent, and it is hardly removed by an alcaline water-based degreasing agent. It is precisely these circumstances that are likely to have spurred on the increasingly extensive use of the efficient but environmentally harmful chemicals. Following the "degreasing" step, the car is washed with a schampoo in order to remove the rest of the degreasing agent and to remove other dirt. During this procedure, the car is flushed from underneath, whereby large amounts of oil originating from the engine and the driving rope are removed. Thereafter follow the rinsing steps the application of a rinsing agent, of wax, and the drying step. Also in this case it is actually desirable to prevent the spent chemicals from being transferred to the drainage.

Against this background it is not an easy task to use chemicals that are really nature-preserving, and still give a satisfactory washing result.

PURPOSE OF THE INVENTION

The purpose of the present invention is to substantially reduce the problems outlined in the aforegoing by suggesting an automatic vehicle washing method which gives a satisfactory washing result without affecting the sewage system. The method may produce a high-concentrate sludge that may be disposed of in a simple manner.

SUMMARY OF THE INVENTION

The above purpose is achieved in accordance with the invention by a method possessing the characteristics appearing from the appended claims.

The method is accordance with the invention thus is characterised essentially therein that the automatic washing of the vehicle is effected in accordance with a counter-flow principle, wherebyin the early steps of the treatment the vehicle will be washed with a washing liquid that is dirtier than in subsequent washing steps, and in that an essential proportion of the washing liquid is reused. In addition, the vehicle is positioned in at least one treatment station where a plurality of the treatment steps are then carried out. In the first treatment step, treatment liquid is supplied from a first treatment tank and is sprayed onto the vehicle together with additives, if any, and together with impurities originating from the vehicle the liquid thus supplied flows through openings in the floor and is returned to the first treatment tank, whereby an essential proportion of the treatment liquid thus is reused. In the following treatment step, treatment liquid is supplied in an equivalent manner from a second treatment tank and is sprayed onto the vehicle together with additives, if any, and is then, after drainage, returned to the second treatment tank, and so on, to be used in the subsequent treatment step, so that in each treatment step a treatment tank specific for that particular treatment step is used and reuse of a substantial. proportion of the treatment liquid takes place. In this manner the treatment liquid becomes increasingly cleaner in each treatment step since it will receive fewer and fewer impurities as the vehicle becomes increasingly cleaner. Each treatment tank is replenished with a supplementary amount of liquid to compensate for the quantity that evaporates during the associated treatment step or is lost in other ways. Each treatment step thus is carried out, when the vehicle is standing still in the treatment station, and several treatment steps may be carried out in the same station.

In each treatment step the treatment liquid thus is transferred to a tank specific for that treatment step and the treatment liquid is reused. In this manner the flow of chemicals and liquid thus is contained in a closed system. Owing to this closed system the amounts of chemicals and water needed are radically reduced. Owing to the closed system no chemical-laden water is emitted to the drains. Instead, it is retained within the installation and recycled and reused therein. Obviously, this is an important advantage from an environmental point of view. The closed liquid flow system also attributes to an improvement of the washing efficiency. This is so, because as a result of the reuse of the washing chemicals the consumption thereof is reduced quite considerably, with the result that it becomes possible to use more potent chemicals without the economy suffering. In addition, the washing liquid may be heated, which increases its detergent effect. Since the heated water is returned to the same tank the energy losses becomes a great deal lower than they would have been, had the heated wash liquid been allowed to flow straight down the drains. In consequence thereof, it becomes possible to use much hotter water than in conventional car washes. The washing efficiency is increased accordingly. All in all; the conditions for achieving an excellent washing result without using brushes are improved. The use of brushes should be avoided since they may damage the car paint. Should it nonetheless be necessary to use brushes in order to achieve an acceptable result, the the higher detergent effect provided by the claimed method makes it possible to use less aggressive brushing.

The treatment steps to which the vehicle is subjected could be carried out in one or several treatment stations. When carried out in a single station, the latter normally comprises a pre-treatment step involving the use of a degreasing agent, followed by washing and rinsing steps and often a finishing waxing step. Since all steps are carried out in the same station, the capacity becomes comparatively low whereas the costs are reasonable. It may be preferred to transfer the pre-treatment step to a separate treatment station which is designed in an efficient manner to receive all the impurities that are loosened in the pre-treatment. In this way, the impurities and the degreasing agent from the pre-treatment will not interfere with the washing and rinsing steps in the subsequent treatment station. Similarly, the finishing waxing treatment could alse be carried out in a separate station.

In accordance with a further development of the invention liquid is carried between the washing and rinsing water tanks in such a manner as to accentuate the counter-flow effect. This means that the tank containing the liquid from the first washing step receives liquid from the tank containing the liquid for the subsequent rinsing step, and that the latter tank receives liquid from the tank containing the liquid for the second rinsing step. In this manner impurities from the tank containing the final rinsing liquid are transferred to the immediately preceding tank, and so on, so that consequently the impurities are transferred towards the preceding treatment steps. This transfer preferably is effected by means of pumps drawing liquid from the liquid surface in each individual tank. In this manner, impurities floating on the liquid surface can be transferred to the tanks corresponding to the previous treatment steps.

In accordance with yet another further development of the invention, a filtering device is used to treat the liquid. This method is used when the liquid contained in a tank has deteriorated to a point necessitating replacement. The filtering device removes impurities and oil droplets. However, washing chemicals preferably are not removed to any significant degree, and consequently these chemicals may be recovered for reuse. Waste from the filtering device is carried to a sludge tank for subsequent destruction.

Further characteristics of the invention and advantages thereof appear from the subsequent detailed description of various embodiments.

DESCRIPTION OF PREFERRED EMBODIMENTS

Figure 1:
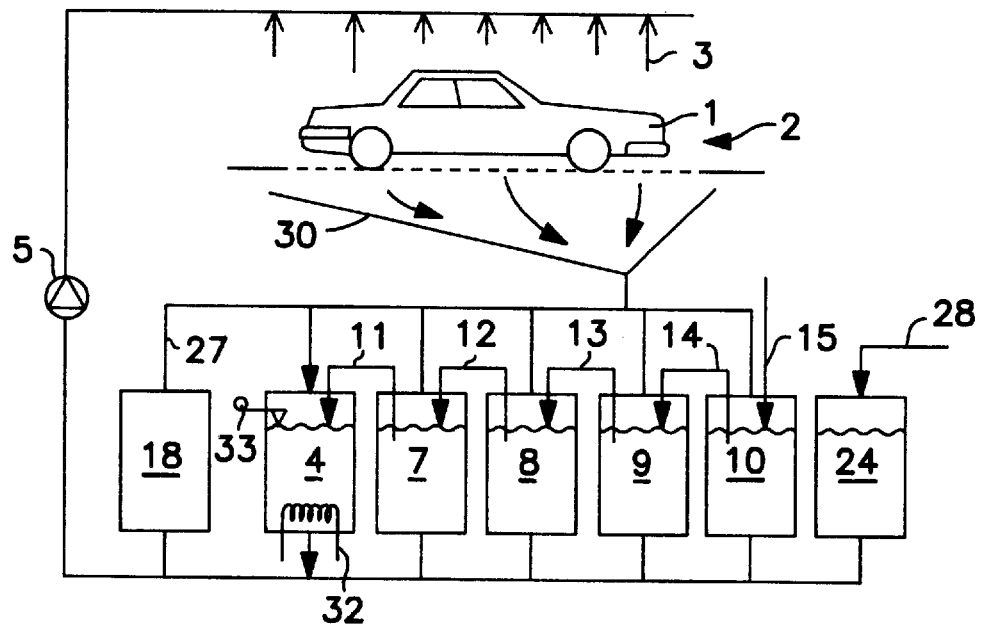
FIG. 1 illustrates schematically a car wash installation in accordance with the subject invention while a particular washing step is in progress. The installation comprises one single treatment station.

In FIG. 1, numeral reference 1 designates a vehicle placed in a treatment station in the vehicle wash installation. The vehicle stands on a perforated surface, such as a floor grating, and spray nozzles are positioned above and laterally of the vehicle in order to spray washing liquid 3 thereon. A collection pit 30 underneath the grate floor receives the washing liquid that is drained off the vehicle. From the lowest point of the collection pit 30 a system of lines leads to a number of tanks, designed 18–24, inclusive. The tanks 18 and 24 are illustrated in dash-and-dot lines since on the one hand they often are not used in the washing process and on the other they often may be positioned in separate stations preceding or following station 2. Tanks 4–10 inclusive are tanks holding washing and rinsing liquids with which car wash installations normally are equipped. The number of tanks used could, on the other hand, vary. When fewer tanks are used the water consumption required to obtain a satisfactory result is increased. The contents of the detergent in the tanks decreased by approximately a power of ten for each step. For instance, if the contents amount to e.g. 1000 units in washing tank 4 they amount to 100 in tank 7, to 10 units in tank 8, to 1 unit in tank 9, and to 0.1 units in tank 10. The boundaries between washing and rinsing therefore are not absolute ones, although for practical reasons it may be suitable to refer to all tanks 7–10 as rinsing liquid tanks. Tank 18 is a pre-treatment tank which is used in connection with degreasing agents or the like. Tank 24 contains a waxing agent to be applied for the finishing waxing treatment of the vehicle. The pre-treatment including a degreasing agent and the finishing treatment by means of wax often are optional steps of the washing programme.

The unique feature of the washing method is, as mentioned previously, that in each washing step for cleaning the vehicle a particular tank is used. FIG. 1 illustrates how washing-liquid is being pumped from tank 4 by the pump 5 and is being sprayed onto the vehicle 1. The washing liquid 3 runs down into this collection pit 30 and from there, it is carried through the system of lines back to the tank 4. In this drawing figure the sections of the system of conduits that are then used are shown in continuous lines whereas remaining conduit sections are indicated in dash-and-dot lines. In order to direct the flow of liquid to the intended one of the tanks electrically controlled valves, for instance, could be used, as appears from FIG. 3. These valves are placed at the inlets and outlets of the tanks. In the example under discussion, the valves above and below tank 4 thus are open, allowing the pump 5 to spray washing liquid from tank 4 onto the car, whereafter this liquid is returned to tank 4. In the shown example tank 4 is provided with a heating element 32, allowing the washing liquid 3 to be heated, which increases the cleaning efficiency. The heated liquid is then again processed inside the same tank. Obviously some losses occur due to evaporation, etcetera. But the major portion of the heated washing liquid 3 thus may be reused thanks to the system described. In this manner the energy consumption is radically reduced. In consequence, considerably higher-temperature water may be used than in a conventional car wash, in which the washing liquid is not reused. The tank 4 is provided with a level sensor 33. To the tank 4 also leads a supply line 11 leading from the neighbouring tank 7, the latter containing the liquid for the subsequent car treatment step. In turn, tank 7 has a supply line 12 leading from the tank 8 containing the liquid for the next step thereafter, and so on. Finally, tank 9 containing the liquid for the second last rinsing step has a filler line 14 leading thereto from the tank 10 containing the liquid for the last rinsing step. A supply line 15 replenishes the tank 4 with essentially clean water.

Figure 2:
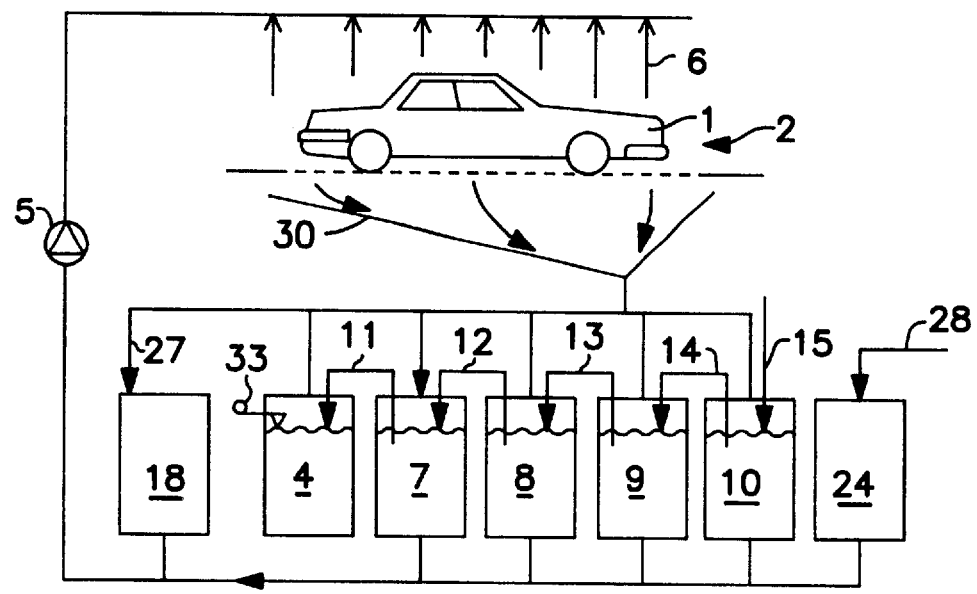
FIG. 2 illustrates the installation of FIG. 1 during the immediately following washing step.

FIG. 2 illustrates the next car treatment step. In this step the pump 5 sprays washing liquid 6 over the car, which liquid runs into the pit 30 and into the system of lines by way of which it is returned to the tank 7. At the start of this treatment step the vehicle is cleaner than in the preceding one, and consequently less impurities will be entrained back to the tank 7. As a result, the liquid inside tank 7 is cleaner than the liquid in tank 4. The same is true as regards the steps thereafter, so that the liquid gradually becomes cleaner upon each step. In the normal case, according to which the ear is washed without being pro-treated with a degreasing agent and without receiving a finishing wax treatment, tanks 4–10, inclusive, are used. A detergent of a suitable type is supplied to the tank 4 or to the line during the first washing step during which washing liquid 3 is sprayed onto the vehicle. Heating of the washing liquid increases the efficiency. Thereafter normally follows a first rinse with liquid from tank 7, see FIG. 2. No detergent is added in this step, but water 6, containing some impurities, is sprayed onto the vehicle. This step is followed by further rinsing steps with liquid from tanks 8 and 9 in the same manner. The last rinsing step with liquid from tank 10 is the final rinse. Since tank 10 is replenished with clean water from line 15 the final rinse is carried out with substantially clean water in order to give optimum results. The washing thus is always carried out in accordance with a counter-flow principle-according to which each washing step is associated with its individual tank. The cleaner the vehicle becomes, the cleaner the washing liquid used, and in the final rinsing step clean water is always used.

The flows of liquid between the various tanks with the aid of lines 11–14, inclusive, are arranged to ensure that the impurities are carried away from the tanks associated with subsequent treatment steps towards the tanks associated with the previous ones. In this manner the liquid contained in the later-step tanks becomes cleaner than it would otherwise have been. In this manner the principle of counter-current washing is reinforced. The basic principle is that the cleaner the vehicle becomes, the cleaner also the treatment liquid becomes. Water and additives are reused in essentially closed systems wherein normally only losses due to evaporation, etcetera need to be replaced. The control of the flows in the lines 11–15, inclusive, could of course be effected in many different ways. In accordance with one solution pneumatically operated pumps of a kind known as "mammoth" pumps incorporating overflow means, are used. They prevent the level inside the tank from which they draw liquid from rising above a certain position. In other words, line 11 restricts the level inside tank 7, line 12 the level inside 8, line 13 the level inside tank 9 and line 14 the level inside tank 10. When the pressure sensor 33 inside tank 4 detects a too-low level condition, the flow in line 15 is opened towards the tank 10. With the aid of the lines 11–14, inclusive, the same amount of liquid that is supplied to the tank 10 then will be transferred to tank 4, provided that the system was balanced in the starting position. In this manner tank 10 is supplied with clean water whereas tho rest of the tanks gradually receive increasingly dirty water. The pump lines 11–14, inclusive, are designed to draw liquid close to the liquid surface in each individual tank. In this manner impurities floating on or adjacent the surface will be transferred to the next (preceding) tank. These impurities may be e.g. oil products or detergents. In the rinsing steps, detergents are regarded as impurities. In the cases when a waxing step is carried out in treatment station 2 no line is used from the waxing tank 24 to tank 10. The reason therefor is that waxing agents from the waxing step would interfere with the final rinse with liquid from tank 10. In the cases when station 2 includes a pre-treatment tank 18 no line for transfer of liquid from tank 4 to tank 18 is, as a rule, used, since detergents from the liquid in tank 4 could negatively affect the degreasing carried out in the pre-treatment stage. For instance, the detergent could have an emulsifying effect on the petroleum fraction of the degreasing agent and it is important that the latter floats on the liquid surface in order to allow it to be separated easily. An adaptation of the detergents and the degreasing agents could, however, perhaps solve this problem.

By way of the lines 11–14, inclusive, the washing and rinsing tanks 4–10, inclusive, normally are closely related. For this reason it may be natural to design them as one single large tank with dividing bulkheads, instead of the schematical divisional design illustrated in the drawing figure. The single-unit tank may also have the collection pit 30 and the perforated floor integrated therewith. In this manner it becomes possible to create a self-contained treatment-station unit which contains all the necessary components of the treatment station. For example, the collection pit and the interconnected tanks could have common side walls supporting the perforated floor, and thus the vehicle 1. The unit may be designed with a moderate height, allowing it to be placed inside many of already existing car-wash installations, render the latter environmentally acceptable. The transfer of liquid from one tank to the other could be solved by arranged them stepwise, whereby minor "waterfalls" will be created at each step. In this manner, no pump would be needed. The weir member between two tanks could be slightly V-shaped in order to dampen the over-flow process. The problem of transfer of liquid from the collection pit 30 to any of tanks 4–10 could also be solved with the aid of a mobile line. In this case, the line may be elastically or telescopically extendible, and consequently all valves, or all valves except one, could be eliminated. The reason for the latter alternative is that it might be desirable that the mobile line is fitted with a valve. Such a mobile line which is shifted laterally from one tank to the next thus means that many valves, usually electrically controlled, may be eliminated, In addition, this principle could be utilized also in the case of the outlet lines from the various tanks. In this case, these lines are replaced by a line which is submerged into the respective one of the tanks and is connected to the pump 5. In this manner also the outlet valves, positioned underneath the tanks, could be excluded. In addition to the cost savings that such an arrangement would involve it would also increase the operational reliability since in total several, usually electrically controlled valves, may be eliminated. In practical terms the solution could involve an articulated suspension arrangement for the suction pipe which is connected to the pump 5. As the pipe is displaced laterally it will climb over a side wall of the tank and be pivoted into the tank, provided that its length is carefully adjusted.

Figure 3:
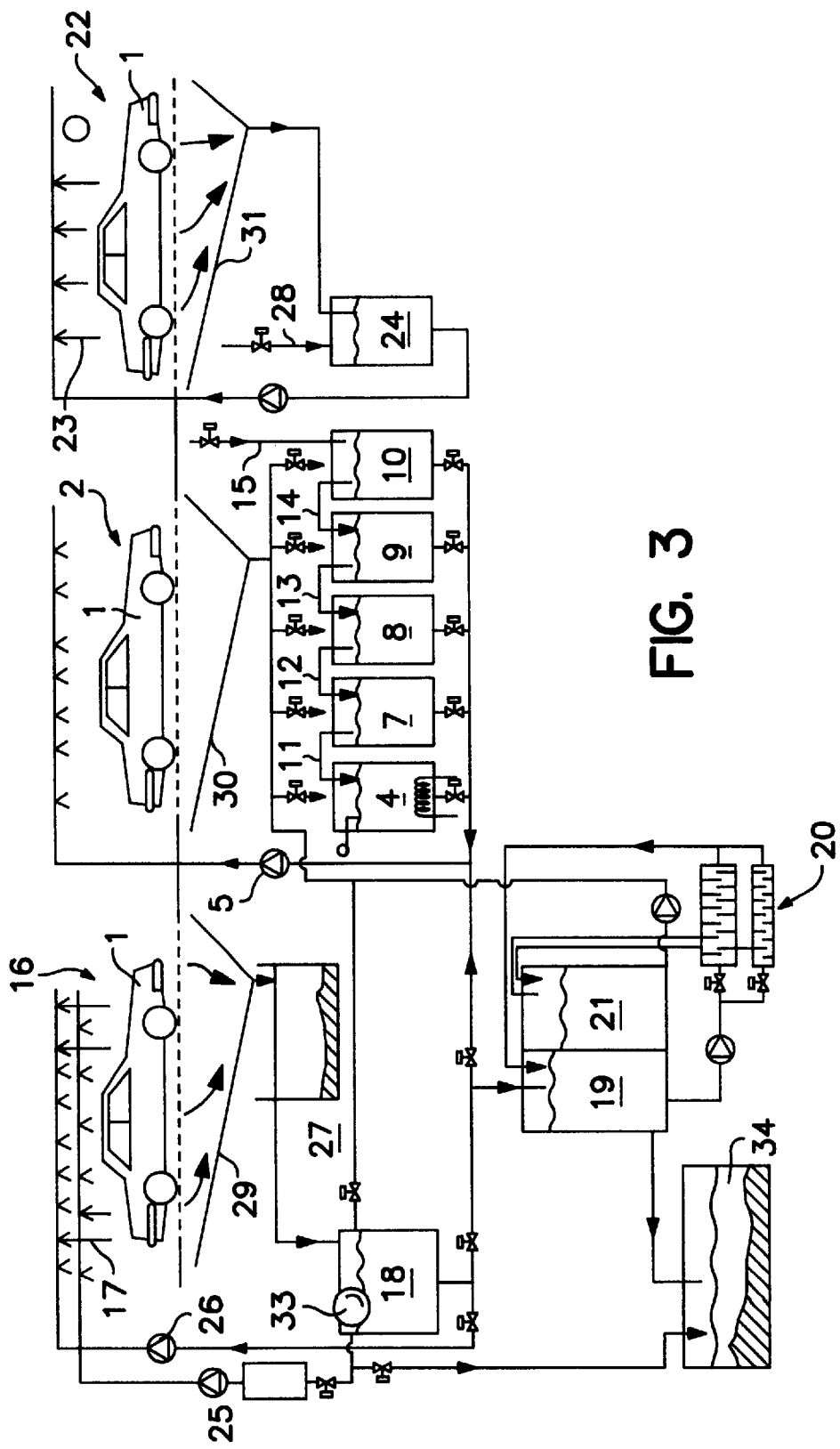
FIG. 3 illustrates a car wash installation comprising three separate treatment stations. The treatment is carried out in the first treatment station and the subsequent treatment steps are indicated by the cars being drawn in dash-and-dot lines.

FIGS. 1 and 2 illustrate schematically the treatment station 2 which ordinarily is used only to wash and rins the vehicle. FIG. 3 illustrates in closer detail a complete car wash installation including three treatment stations 16, 2 and 22. Station 16 is a pre-treatment station wherein a decreasing step and a pre-washing step associated therewith are carried out. Station 2 is a car washing and rinsing station and station 22 a car waxing station. In the drawing figure the vehicle is shown when being treated in station 16. From there, the vehicle is driven to the next station, or, is conveyed to that station automatically, and finally it is driven or conveyed to the last treatment station 22. One advantage of using several treatment stations is that the capacity increases, since several cars may be treated simultaneously. At the same time the costs of the installation are increased, however. From a capacity point of view it is important that the duration of the treatment is approximately equal in all stations. This means that from a capacity point of view it may for instance by advisable to transfer one or two rinsing steps and the tanks 9 and 10 associated therewith to the waxing station 22. In an equivalent manner it would be possible to transfer the first washing step to station 2 and possibly a rinsing step to the pre-treatment station 16. However, a decisive factor in the allocation of the various functions to the various treatment stations also is the interaction of the impurities and the chemicals from one step to the next. Some mixing between the steps does occur on account of the liquid remaining in the respective one of collection pits 29–31.

In the pre-treatment step 16 a degreasing medium is sprayed onto the vehicle from a tank 25. A pump 26 pumps washing liquid from the pre-treatment tank 18 and sprays it onto the vehicle. The washing liquid is used for rinsing purposes and normally it does not contained any additives but obviously it do so. The supplied liquids run down into the collection pit 29 and are carried to a first tank 27, which serves as a sand trap, wherein gravel and other heavy particles thus settle on the bottom of the tank whereas a line leads from the upper part of the tank to the pre-treatment tank 18. In the latter a surface-suction device or skimmer 33 draws liquid from the surface. The degreasing agent, which usually is a petroleum fraction, is lighter than water and therefore collects on the surface of the liquid contained in tank 18, From the skimmer 33, the degreasing agent usually is returned to the tank 25 but it could also be carried to the sludge tank 34. The latter procedure is adopted as the need arises, i.e. when for various reasons it is advisable to replace the degreasing agent. As already mentioned application of the degreasing agent following by rinsing could be repeated several time, depending on how dirty the vehicle is. In pre-treatment station 16 the degreasing agent thus is reused as is also the washing or rinsing liquid 17. This means that the chemicals are used in a closed system and consequently more potent chemicals may be used than in washing installations wherein the chemicals are emitted ill untreated condition to the drains, to a recipient or to the sewage disposal system.

The closed-loop flow of the chemicals thus gives a definite environmental advantage but also a possibility to use more potent chemicals with consequential improved washing results. Also in the subsequent treatment stations 2 and 22 the flow of chemicals is carried out in a closed system and thus the advantages outlined above apply to the entire installation. As regards the treatment in station 2 the information referred to in connection with FIGS. 1 and 2 applies.

Treatment station 22 is intended for the waxing and the drying treatments of the vehicle. The waxing liquid 23 is carried front the waxing-liquid tank 24 and is sprayed onto the vehicle. The liquid thereafter runs into the collection pit 31 and from there it is returned by way of a line to the waxing-liquid tank 24, thus creating a closed-loop flow. Liquid losses occurring during the taxing treatment are replaced by supply, through line 28, of essentially clean water to which a waxing agent has been added.

The division of the washing installation into three treatment stations 16, 2 and 22 as shown is particularly useful to ensure that the chemicals are not mixed in an undesirable manner. For instance, the waxing agent liquid 23 has its own collection pit 31 and its own lines. In this way it cannot interfere with the results from the final rinsing with liquid from tank 10 of the previous treatment station. In the same manner detergents contained in tank 4 cannot cause emulsifying problems in the pre-treatment liquid tank 18. Furthermore, a major proportion of the dirt removed from the car is separated already in the first treatment station 16 in which, as mentioned, a particular sand trap is used.

As already mentioned, the closed-loop flows make it possible to use more potent chemicals than may be used in conventional car washes. This means that the washing system in accordance with the invention increases the chances of a satisfactory washing result without the use of brushes. The use of rotating brushes often are the cause of scratches on the finishing paint of the car and for this reason utilization thereof is under dispute. At the same time there is a feeling within this technological field that the use of brushes may be necessary in order to remove certain types of thin film and dirt on the car. In any case, the method in accordance with the invention makes it possible to use softer-acting brushes than could be done in conventional car-washes.

The capacity of the washing installation is, as mentioned, dependent on the number of treatment stations it contains. When three treatment stations are used the capacity of the installation will be very high but comparatively large-area premises are required and the costs thereof are comparatively high. To shorten the duration of the treatment in each step an obvious method is to endeavour to speed up the flow of liquid to each individual tank. This could be effected by using e.g. scraper means positioned so as to effect their scraping action along the bottom of the pit and towards the outlet therein. When the liquid reaches the conduit system pressurized air may be blown thereinto for quicker evacuation of the lines. By making use of this technique the capacity of the system thus is increased but it likewise becomes possible in this manner to reduce the intermingling of liquids from the various washing steps. This means that less liquid remains inside pits and lines when the next treatment step is initiated and new liquid is admitted. In this way the possibilities for using one single treatment station instead of two or even three are increased, as also for using two treatment stations instead of three, which could provide substantial economical gains.

A separating or filtering device 20 and associated tanks 19, 21 and 34 could also be coupled to the system. From tanks 18, 4, 7–10 inclusive, liquid may be transferred to a collection tank 19 when a cleaning need exists. The transfer may be effected when the liquid in any particular tank becomes too laden with impurities. From the collection tank liquid is then pumped through the filtering device 20. The latter could e.g be in the form of a centrifugal device for separation of coarser fractions and a filter for separation of primarily impurities and oil. The filter may operate in accordance with the membrane filtering technique. If a filter of micro-filter type is used large oil drops and impurities may be separated whereas most of the washing chemicals, for example tensides, pass through the filter. This is desirable in order to reduce the consumption of chemicals. If instead the ultra-filtering technique is used, essentially all oil is separated together with a majority of the washing chemicals. The choice of the chemicals and the proportional use thereof as regards purity and consumption is made in connection with the choice of the filter. The drawing figure shows a micro-filter and a salt filter coupled in parallel. Cleaned liquid is transferred to a clean-water tank 21. The degree of purity depends on the actual cleaning capacity of the filter. From the clean-water tank 21 lines lead to the tanks 4, 7–10. These lines are partially integrated with the lines leading from the collection pit 30 and to various tanks. In addition, one line 27 leads to the tank 16 containing pre-treatment liquid. With the aid of a pump and valves inserted in the lines water from the clean-water tank thus could be carried to the selected tank. The material which is separated in the filtering device 20 is returned to the collection pit 19. From the lower part of the latter a line leads to a sludge tank 34, allowing sludge and impurities to be transferred to that tank for subsequent processing.

Within the scope of the present invention several modifications naturally are possible. For example, a number of tanks may be placed above the vehicle and the liquid instead be pumped up to the associated tanks and flow therefrom by gravity. Part of the installation, such as the treatment stations 2 and 22, could be integrated with one another into a container-like unit which could be joined to an already existing car wash which in this case contains e.g. pretreatment station 16.

I claim:

1. A method for automatically cleaning vehicles of impurities contained thereon comprising the steps of:

providing at least a first washing tank and a second washing tank;

positioning a vehicle in a first treatment center for performing at least one washing treatment cycle thereon;

obtaining a treatment liquid from the first washing tank and adding an additive to the treatment liquid before washing the vehicle of a portion of said impurities by spraying the vehicle with the treatment liquid and the additive, thereby producing a used first treatment liquid containing the impurities;

collecting the used first treatment liquid and directing it into the first washing tank without providing a means for removing said portion of said impurities from the first treatment liquid;

obtaining a second treatment liquid from the second washing tank and adding a second additive to the second treatment liquid before washing the vehicle of the remaining impurities by spraying the vehicle with the second treatment liquid and second additive thereby producing a used second treatment liquid containing a relatively smaller amount of impurities as said used first treatment liquid;

collecting the used second treatment liquid and directing it into the second washing tank without providing a means for removing said impurities from the second treatment liquid;

repeatedly spraying said first treatment liquid and second treatment liquid and collecting said used first and second treatment liquids;

obtaining a fresh treatment liquid from an outside source and supplying the fresh treatment liquid to the second washing tank upon demand in order to replenish said second treatment liquid;

replenishing said first washing tank upon demand with a portion of the used second treatment liquid from the second washing tank;

reusing and recirculating the first treatment liquid and the second treatment liquid of each respective washing tank thereby establishing a counter-flow principle wherein the first treatment liquid containing the highest impurities relative to said tanks is initially used to clean said vehicle, said used second treatment liquid in the second washing tank containing a higher percentage of the fresh treatment liquid than the first treatment tank is used to clean said vehicle in a repeated washing cycle.

2. The method as claimed in claim 1, further comprising of the steps of heating the fresh treatment liquid and obtaining a waxing agent from a first waxing tank, then spraying the waxing agent onto the vehicle.

3. The method as claimed in claim 1, further comprising the steps of obtaining a degreasing agent containing a petroleum fraction from a degreasing tank and then spraying the degreasing agent onto the vehicle prior to said vehicle being sprayed with said first treatment liquid and first additive; then obtaining a fresh pretreatment liquid from a first pretreatment tank and then spraying the fresh pretreatment liquid from the first fresh pretreatment tank onto the vehicle in order to wash the vehicle of a portion of impurities, thereby producing a first used pretreatment liquid;

collecting the first used pretreatment liquid and then directing the collected first used pretreatment liquid into the first pretreatment tank.

4. The method as claimed in claim 3, further comprising the steps of obtaining a second fresh pretreatment liquid from a second pretreatment tank and then spraying the second fresh pretreatment liquid onto the vehicle in order to wash the vehicle of another portion of impurities after spraying said first pretreatment liquid and the degreasing agent, thereby producing a used second pretreatment liquid;

collecting the used second pretreatment liquid and directing the used second pretreatment liquid into the second pretreatment tank.

5. The method as claimed in claim 1, comprising the steps of:

wherein at least a first vehicle pretreatment step is performed in a pretreatment center.

6. The method as claimed in claim 1, further comprising the steps of performing a last waxing step in a waxing station after said vehicle is sprayed with said first and second treatment liquids by pumping a fresh first waxing agent from a first waxing tank and then spraying the fresh waxing agent onto the vehicle, thereby producing a used first waxing agent;

collecting the used first waxing agent and directing the used first waxing agent into the first waxing tank where it is combined with said fresh waxing agent as said fresh waxing agent is pumped into said first waxing tank;

reusing the combination of the fresh first waxing agent and the used first waxing agent from within the first waxing tank.

7. The method as claimed in claim 1, further comprising the steps of obtaining a second fresh treatment liquid from an outside source and pumping the second fresh treatment liquid into a last treatment tank containing said used second treatment liquid to produce a combination of used second treatment liquid and second fresh treatment liquid in the last treatment tank;

pumping the combination of the used second treatment liquid and the second fresh treatment liquid into the second washing tank to produce a combination of the used second treatment liquid and the first fresh treatment liquid within the second washing tank;

pumping a combination of the used second treatment liquid and the fresh second treatment liquid from the second washing tank into the first washing tank.

8. The method as claimed in claim 1, further comprising the step of:

positioning at least one of a collection pit in a treatment station;

pressurizing air;

blowing clean a line leading from the collection pit to the treatment tank in order to shorten the duration of the treatment in that station.

9. The method as claimed in claim 1, further comprising the steps of transferring the first and second treatment liquids contained in each of the first and second washing tanks to a common working tank upon a need for cleaning of the first and second treatment liquids;

transferring the combined first and second treatment liquids in the working tank to a separation device;

cleaning the combined first and second treatment liquids in the separation device in order to produce a clean combined first and second treatment liquid;

transporting the clean combined first and second treatment liquid to a clean water tank;

transporting the combined clean treatment liquid front the clean water tank to each of the first and second washing tanks.

10. The method of claim 1, further comprising the steps of heating the liquid carried within said first washing-liquid tank, using an essentially clean water in a final rinsing step; and then spraying a liquid wax onto the vehicle.

11. The method of claim 10, further comprising the steps of providing a wax-treatment station and a liquid wax tank, said wax station having a floor with openings in the floor for causing a reuse of a substantial proportion of the waxing liquid.

12. The method of claim 1, further comprising the step of providing a pre-treatment station wherein the vehicle is first treated to an initial spraying treatment before said vehicle reaches the treatment station.

13. The method of claim 1, further comprising the steps of providing third and fourth washing tanks, each of said third and fourth washing tanks respectively associated with a third and a fourth vehicle spraying step and provided with a respective third and fourth treatment liquid and additive therein; and then transferring the third treatment liquid from the third washing tank to the second washing tank;

transferring the fourth treatment liquid from the fourth washing tank to the third washing tank; and then supplying the second washing tank with a third and fourth treatment liquid so that impurities are transferred from each of the third and fourth washing tanks in the direction towards the first washing tank, the transfer making the first and second treatment liquid cleaner in each respective washing tank upon each treatment step.

14. The method of claim 1, further comprising the steps of transferring upon demand, the treatment liquid from at least one of said washing tanks to a filtering device by way of a working tank, from which a filtered cleaned treatment liquid is returned by way of a clean-water tank to at least one of said washing tanks.

15. The method of claim 14 wherein said filtering device is comprised of a separation device.

16. The method of claim 15, further comprising the step of separating impurities and oil droplets from the treatment liquid from said at least one washing tank without removing the first additive and the second additive from the treatment liquid.

17. The method of claim 1, further comprising the step of pressurizing at least one of the treatment tanks in order to shorten a duration of treatment cycle time in the first treatment center.

* * * * *